United States Patent
Lambert et al.

(10) Patent No.: US 7,124,337 B2
(45) Date of Patent: Oct. 17, 2006

(54) DATA STORAGE APPARATUS AND METHOD FOR HANDLING DATA ON A DATA STORAGE APPARATUS

(75) Inventors: Nicolaas Lambert, Eindhoven (NL); Ozcan Mesut, Eindhoven (NL); Rudi Jozef Marie Wijnands, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 41 days.

(21) Appl. No.: 10/502,526

(22) PCT Filed: Dec. 23, 2002

(86) PCT No.: PCT/IB02/05727

§ 371 (c)(1),
(2), (4) Date: Jul. 26, 2004

(87) PCT Pub. No.: WO03/065369

PCT Pub. Date: Aug. 7, 2003

(65) Prior Publication Data

US 2005/0086573 A1    Apr. 21, 2005

(30) Foreign Application Priority Data

Jan. 29, 2002   (EP) .................. 02075350

(51) Int. Cl.
*G11C 29/00* (2006.01)
*G11B 7/00* (2006.01)

(52) U.S. Cl. .................. 714/723; 714/710; 369/53.35
(58) Field of Classification Search ............. None
See application file for complete search history.

(56) References Cited

U.S. PATENT DOCUMENTS

| | | | | |
|---|---|---|---|---|
| 4,787,060 A | * | 11/1988 | Boudreau et al. | 711/172 |
| 5,166,936 A | | 11/1992 | Ewert et al. | 371/21.6 |
| 5,297,148 A | * | 3/1994 | Harari et al. | 714/710 |
| 5,831,914 A | * | 11/1998 | Kirihata | 365/200 |
| 6,034,831 A | | 3/2000 | Dobbek et al. | 360/53 |
| 6,101,619 A | | 8/2000 | Shin | 714/710 |

FOREIGN PATENT DOCUMENTS

WO   WO9803970    1/1998

* cited by examiner

*Primary Examiner*—Christine T. Tu
(74) *Attorney, Agent, or Firm*—Michael E. Belk; Paul Im (57) ABSTRACT

Real-time audio video applications require guaranteed request service times from a hard disc drive. This requirement is not always fulfilled due to some unexpected delays in service times. Re-allocated sectors are one of the causes of such delays. A scheme for conversion of re-maps into slips in a hard disc drive is suggested. Converting re-allocated sectors into slipped or skipped sectors can prevent such a delay, since slipped sectors cause much less or even negligible performance loss than re-allocated sectors.

26 Claims, 5 Drawing Sheets

| | | UA | | | | | | SA | | | | UA | | | | | | | SA | | |
|---|---|---|---|---|---|---|---|---|---|---|---|---|---|---|---|---|---|---|---|---|---|
| Physical | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| 1st Format | 0 | 1 | 2 | 3 | 4 | 5 | 6 | 7 | S | S | S | 8 | 9 | 10 | 11 | 12 | 13 | 14 | 15 | S | S | S |
| Fact. Test 12 Slipped | 0 | 1 | 2[B] | 3 | 4 | 5 | 6 | 7 | S | S | S | 8 | 9 | 10 | 11 | 12 | 13 | 14 | 15 | S | S | S |
| Grown 2 Remap | 0 | 1 | [F] 2 | 3 | 4 | 5 | 6 | 7 | S | S | 2 | 8 | 9 | 10 | 11 | 12[B] | 13 | 14 | 15 | S | S | S |
| Free 1..4 Bubble | 0 | 1[F] | [F] 2 | [F] 3 | [F] 4 | 5 | 6 | 7 | S | S | [F] 4 | 8 | 9 | 10 | 11 | 12 | 13 | 14 | 15 | S | S | S |
| Free 1..6 Bubble | 0 | 1 | [F] 2 | [F] 3 | [F] 4 | [F] 5 | [F] 6 | 7 | S | S | [F] 6 | 8 | 9 | 10 | 11 | 12 | 13 | 14 | 15 | S | S | S |
| Free 4..9 Bubble | 0 | 1 | 2 | 3 | [F] 4 | [F] 5 | [F] 6 | [F] 7 | S | S | S | [F] 8 | [F] 9 | 10 | 11 | 12 | 13 | 14 | 15 | S | S | S |

DATA STORAGE APPARATUS AND METHOD FOR HANDLING DATA ON A DATA STORAGE APPARATUS

The invention regards a method for handling data on a data storage apparatus comprising a data storage medium, the medium having a user area and a spare area defined thereon, wherein upon detection of a defect on the medium in a first step the data assigned to the defect are allocated and mapped into the spare area. The invention further regards a data storage apparatus comprising a data storage medium formatted in a predetermined architecture comprising a plurality of at least one format feature and having a user area and a spare area defined thereon.

Hard disc based devices recording e. g. multimedia streams like MPEG-encoded video require real-time file systems for writing the data to a disc and for reading the data back. Real-time file systems try to write all files in time but sometimes cannot succeed for example because of disc problems. Conventionally there are then two options: writing the data too late, or discarding some of the unwritten data. The first option will typically cause buffer overflows for recording, which may lead to a significant data loss. The second option may also result in a data loss. Conventional data oriented operating systems have no real-time requirements and attend to aim for a maximum data integrity, delaying completion of each command until properly executed.

In particular real-time audio-video applications require guaranteed request service times from a hard disc drive. This requirement is not always fulfilled due to some unexpected delays in service time. Replaced sectors, i. e. data of defect sectors allocated to remote spare areas on a disc are one of the reasons for such delays. The delays mainly result from searching replaced sectors and from accessing the remote spare area to which the defect sector data have been allocated to. Such remote spare area conventionally is located in a track or tracks other than the originally accessed track of the defect sector. Therefore, track switching as well as seek time causes such delay.

In the U.S. Pat. No. 6,101,619 a scheme is provided to reduce the number of searches by accessing replaced sectors at preferably later times subsequent to a usual data access. In the U.S. Pat. No. 5,166,936 or the WO 98/03970 low level formatting of tracks is suggested to build good tracks of data and to prevent a further access of a defect. Such measures take considerable effort and may only be done in idle time. Moreover such transaction system should be guarded against power failures.

Further in the U.S. Pat. No. 6,034,831 it is suggested to write data which were originally scheduled to be written to a defective region, to a substantially adjacent non-defective area on the original track, if the size of the defective region does not exceed a threshold size and to write such data to a remote non-defective area outside the original track if the size of the defective region exceeds a threshold size.

This scheme still requires for a track switch and is restricted to limited threshold size of the defective region the threshold size is preferably only one sector. Still such schemes are not able to guarantee a request service time in case of an access to a defective region or a block that contains defect, replaced or allocated sectors.

This is where the invention comes in, the object of which is to specify a method for handling data on a data storage apparatus comprising a data storage medium, in particular to specify a method for handling data on a disc drive comprising a data storage disc, by which a request service time may be guaranteed, even in case of an access to a region at the storage medium containing defective or replaced sectors. A further object of the invention is to specify a data storage apparatus comprising a data storage medium, in particular to specify a disc drive comprising a data storage disc, adapted such that a request service time can be guaranteed even in case of an access to a region of the storage medium that contains defective or replaced sectors.

The object regarding the method is solved by a method for handling data on a data storage apparatus comprising a data storage medium, in particular by a method for handling data on a disc drive comprising a data storage disc, the medium having a user area and a spare area defined thereon and wherein upon detection of a defect on the medium in a first step the data assigned to the defect are allocated into the spare area and wherein according to the invention in a further step information is provided about the size of a contiguous free region in the user area and the data allocated in the spare area are at least partially re-allocated into the contiguous free region if the size of the contiguous free region exceeds or is equal to a determined threshold size.

It was realised, that even if data originally scheduled to a defect region are allocated or re-placed or re-mapped to a remote spare area this may cause significant performance losses. Data allocated in a remote spare area will in practice usually not happen at the end of an allocation unit, being the smallest addressable unit in a file system. Desirable would be a scheme capable to allocate or re-map data to the end of an allocation unit. The main idea therefore is to re-allocate and re-map data, which were mapped in a remote or other spare area. Preferably the data are re-allocated on the whole, but at least partially into a contiguous free region in the user area if the size of the contiguous free region exceeds or is equal to a determined threshold size. In practice such re-allocation and re-mapping will happen advantageously at the end of an allocation unit. Therefore, a performance loss is substantially reduced by the method proposed. In summary it is based on the idea to convert data, which were allocated, mapped or placed in a spare area, into re-allocated and re-mapped data in a contiguous free region, preferably in the user area.

Continued developed configurations are further outlined in the dependent method claims.

In preferred configuration the information is provided by a host connected to the apparatus by an interface. This information is used to re-allocate data mapped in a remote or other spare area into the contiguous free region. Such information may contain location and size of the contiguous free region. It is preferably not necessary to keep track of a list of free regions for the entire medium. Efficiently the threshold size is determined as being essentially equal to the size of the largest contiguous free region in the user area. In particular a host may declare the largest contiguous free region, not just the newly freed up region. Advantageously the threshold size may also be determined in correlation with one logical consecutive sequence of data mapped in a spare area. This allows for an effective re-allocation of data.

In a further configuration also the information may be provided by a controller comprised by the apparatus. This development makes the apparatus responsible for the full knowledge about defect handling, so that the defect handling is executed almost solely by the apparatus, in particular by the controller alone, i. e. the defect handling may be done on-the-fly without occupying the host. The only information which may be provided by the host is an information, that a contiguous free region occurred.

The file system of the host may do a very similar thing and may actually allow to reserve or create more free or spare regions in the user area if needed. At least the host may find out about mapped sectors in a standardised way.

In a further configuration defect data may preferably be re-mapped and/or re-allocated to a preferred pre-determined address area. The simplest approach would be then to simply never review such address area as long as it is not necessary.

In a further configuration a protocol between the storage apparatus and a host may record information of the re-allocation of data as outlined above.

In a preferred continued developed configuration a plurality of spare area arrays may be provided additional to remote spare areas or alone and each of the spare area arrays respectively may be assigned to essentially each of a plurality of format features of the data storage medium and thereby serve as a contiguous free region in the user area. As a format feature on a data storage disc comprised by a disc drive may be understood in particular a zone, a track or a cylinder in case of multitude discs, a block on a track or as well a sector. Since thereby spare sectors may be provided on each track any data mapped and allocated in a remote spare area may be re-allocated within the reach of each data transfer access without switching a track. This configuration of the proposed method may be done automatically, i. e. by the apparatus, without the intervention of the host. Also this configuration may be done on-the-fly since the logical to physical address mapping is done in the controller of the data storage apparatus. Even if no spare sectors in the reach of each data transfer access may be available, the conversion of data can still be done automatically.

If such spare array areas should happen to be fully occupied the corresponding data may also be re-allocated to a contiguous free region in the user area.

The data are preferably re-allocated by slipping. This means not only a shift in the logical to physical address mapping but also a shift in the content of the corresponding sectors. As far as possible data originally allocated in a remote spare sector are re-allocated to the contiguous free region in sequential order.

Advantageously in the further step the re-allocation and re-mapping of data from a spare area to the user area is repeated until preferably all data of at least one logical consecutive sequence is re-allocated in the contiguous free region in the user area Preferably the data are re-allocated at least in units of an allocation unit. A full re-allocation of all data of at least one logical consecutive sequence is aimed for. Thereby performance losses are essentially prevented as e. g. a track switch or a search for data mapped in a remote spare sector is not necessary.

In a preferred configuration the incorporation of logical block addresses is prevented in the error correction code (ECC). In particular the use of physical block addresses for an error correction code as an alternative to logical block addresses is preferred. This avoids the need for complete formatting or low level formatting of a data storage medium in case of changes in mapping. By the use of physical block addresses the error correction code of each sector must not be updated accordingly if any changes are made in the logical to physical address mapping of the data storage medium as proposed. The use of physical block addresses in the error correction code of a data storage medium allows for frequent changes on the medium in an efficient way.

Further the invention leads to a data storage apparatus comprising a data storage medium, in particular the invention leads to a disc drive comprising a data storage disc, formatted in a pre-determined architecture comprising a plurality of at least one format feature and having a user area and a spare area by which the object regarding the data storage apparatus is solved. According to the invention in such data storage apparatus the format architecture provides a plurality of spare area arrays, each of the spare area arrays being respectively assigned to each of the plurality of a format feature. In particular in a disc drive comprising a data storage disc such format feature may be selected from the group consisting of zones, cylinders and tracks.

Continued developed configurations are further outlined in the dependent apparatus claims.

Advantageously the format architecture provides a plurality of spare area arrays wherein each of the spare area arrays are respectively assigned to each of a plurality of tracks.

Further the proposed data storage apparatus advantageously comprises a read/write-head, a drive to rotate the data storage medium and a servo to move the head, a controller having a control electronics, a microprocessor and a memory and further an interface for connecting the apparatus to a host.

The invention will now be described with reference to the accompanying drawing. The figures of the drawing illustrate in a schematic and not necessarily scaled form preferred embodiments of the invention compared to prior art. The figures illustrate in.

Figure 1:
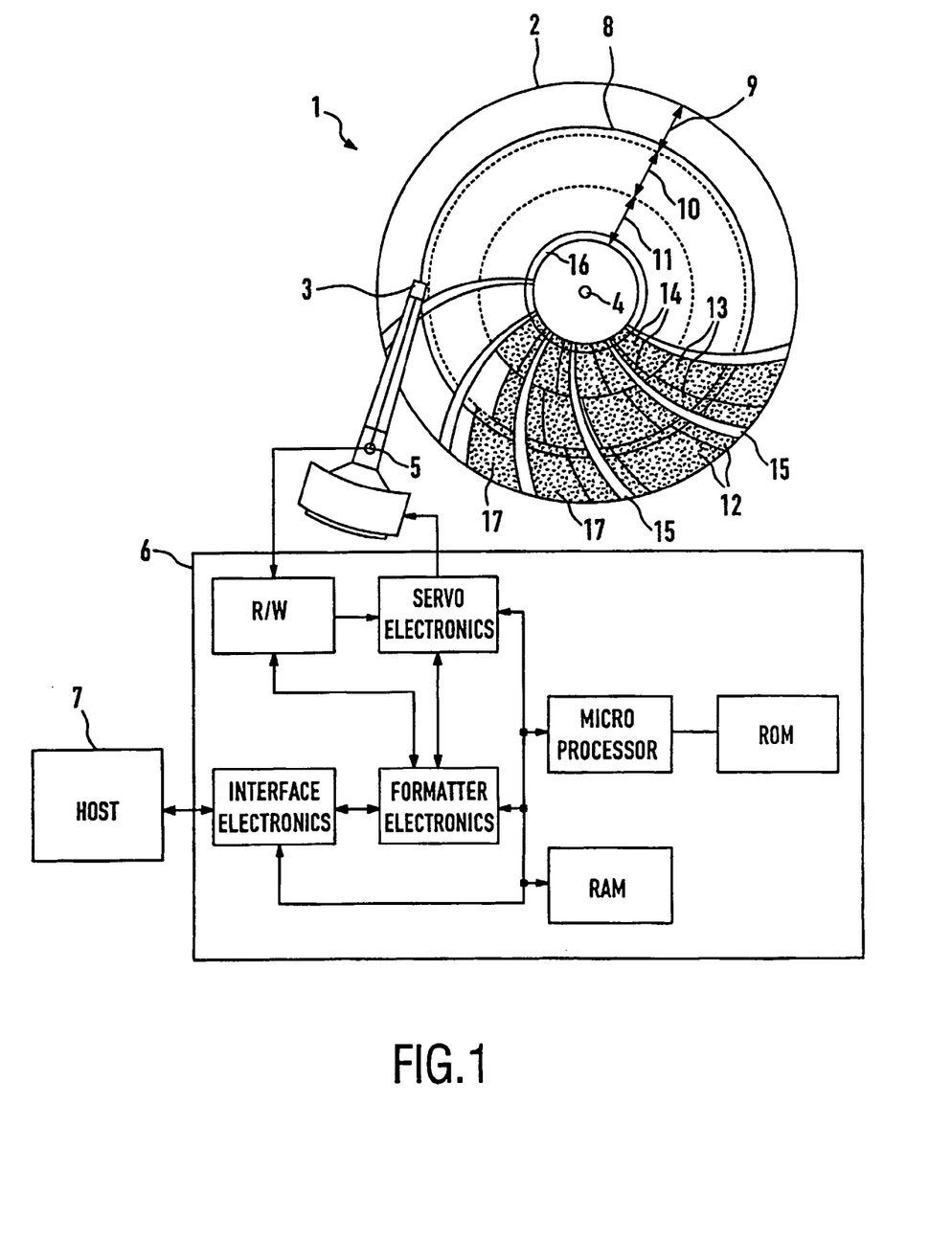
FIG. 1: a hard disc drive of prior art.

FIG. 1 illustrates the structure of a hard disc drive 1 comprising a data storage disc 2, a read/write-head 3, a drive, which is not shown, to rotate the data storage disc 2 around a spindle 4 and a servo, which is not shown, to turn the head 3 around an axis 5 to move the head 3 to a pre-determined position on the disc 2 to transfer data therewith. The head 3 is controlled by a read-and-write electronics and a servo electronics being part of the controller 6 of the disc drive. The controller 6 further comprises a formatter electronics which upon a data request converts such request into corresponding numbers of format features of the disc 2. Such data request may be received from a host 7 by an interface and an interface electronics. Further the controller 6 comprises a microprocessor, ROM and RAM e. g. a buffer memory.

The disc 2 contains according to a format architecture a plurality of format features of the kind selected from the group of zones 9, 10, 11 each comprising a plurality of tracks

8. A track is divided into a plurality of blocks 12, 13, 14. Preferably all blocks 12, 13 and 14 have the same size of data capacity. As the number of blocks per track may vary from to track or zone to zone some of the blocks may be divided by servo wedges 15. Servo wedges may also be evenly spaced radially around the disc like spokes on a wheel. If the disc drive 1 should contain multiple heads 3 for multiple discs 2 then the tracks 8 of a disc 2 and the corresponding tracks 8 of the further discs being at the same radius are referred to as a cylinder. In this case each track assigns a respective cylinder. Further in a conventional drive a remote spare area 16 is provided on the disc 2 as a track or plurality of tracks at the inner circumference of the disc 2. Such remote spare area may be conventionally also provided as evenly spaced spare tracks at further circumferences on the remaining area of the disc.

Figure 2A:
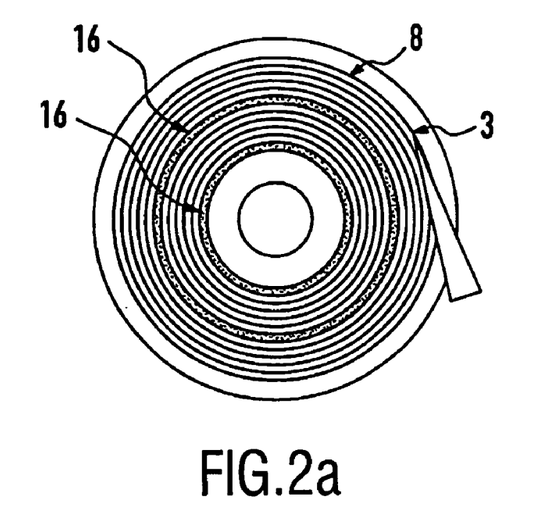
FIG. 2*a:* a hard disc drive of prior art with remote spare areas.

The number, size and allocation of remote spare areas may be different for different hard disc drives depending on the manufacturer and product family. For instance there can be a number of remote spare areas 16 evenly spaced in the address space as indicated in FIG. 2*a*. Also there may be just one remote spare area 16 located at the inner diameter, outside the user addressable area as shown in FIG. 1.

Each data storage apparatus and in particular disc drive may have dependent on its structure and handling a maximum service time. The maximum service time of a drive is the total time of the data transfer and the maximum access time and can be calculated using the formula T=AX+B. The parameter A is the transfer time of a single sector expressed in time per sector. The parameter X is the number of sectors to be transferred and the parameter B is the maximum access time which is the sum of seek time and rotational latency time. Rotational latency time may in particular but not only result when the read/write-head has to switch to a next track. In the preferred embodiment of the invention the latter may advantageously be restricted to one full rotation.

There are cases where a conventional drive is not able to finish a request within this maximum service time. Examples of such cases are retries due to an error correction code error, servo errors due to shocks and vibrations and hard errors. Hard errors are caused by media defects and are handled conventionally by the defect management of a drive. When an error correction code error cannot be corrected with several retries it is possibly caused by a media defect. To verify that the error was caused by a media defect, the drive performs a media test on each defective sector. The media test consists of write/read-verifies, wherein the suspicious sectors are written and read several times. If any of them fails then the sector is a grown defect and is conventionally allocated to a remote spare sector. FIG. 2*a* shows a schematic view of a data storage disc with a head 3 and a plurality of tracks 8 containing two remote spare areas 16.

Figure 2B:
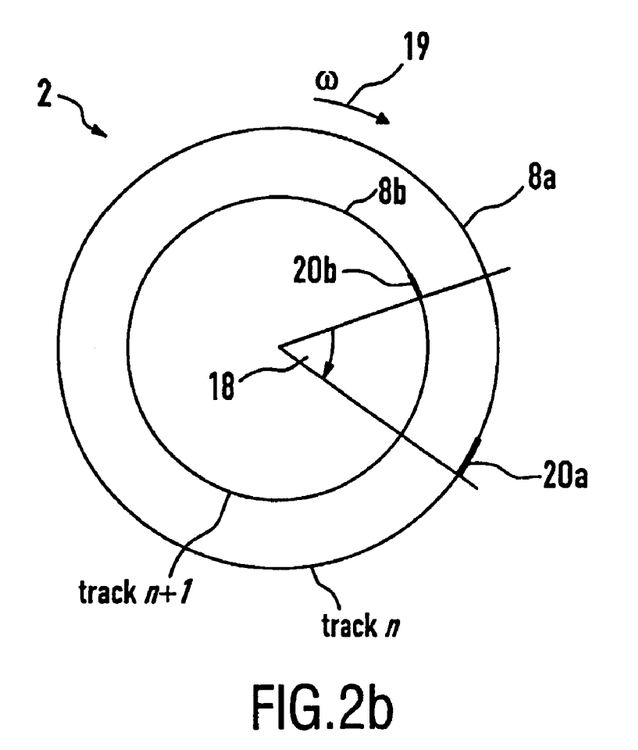
FIG. 2*b:* a hard disc drive of prior art with conventional skew.

FIG. 2*b* illustrates schematically a conventional track skew 18 of an outer track 8*a* adjacent to an inner track 8*b* upon an angle 18 in circumferential direction in the direction of rotation 19 of the disc 2. Corresponding first sectors referred to as start sectors of the tracks 8*a* and 8*b* are depicted as 20*a* and 20*b*.

As shown in FIG. 2*b* a track skew may be employed in hard disc drives to minimise rotational latency time. Rotational latency time results when the drive has to switch to a next track to access sequential data. Conventionally a skew is large enough to make sure the head 3 has enough time on the next track 8*b* to settle and to read a position information after it is switched to a next track 8*b*. Such position information usually is comprised by a servo wedge 15 on each track. Servo wedges may also be evenly spaced on a disc like spokes on a wheel. Therefore, track skewing provides a mutual shift of corresponding sectors in adjacent tracks in a circumferential direction 19 relative to each other. Due to track skewing e.g. corresponding sectors of tracks are not localized in radial direction along a straight line but instead along bended lines 17 such as depicted in FIG. 1.

Figure 3A:
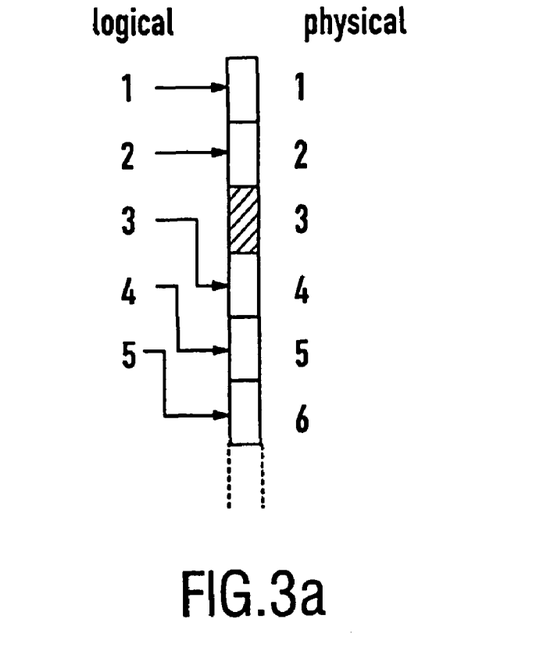
FIG. 3*a:* a scheme of sector skipping and slipping in a preferred embodiment.

Conventionally only during manufacturing defective sectors are skipped. In a preferred embodiment as shown in FIG. 3*a* occurring during use of the data storage apparatus, known as a grown defect may be a defective sector 3 replaced by a next immediate spare sector in order to maintain the sequential ordering of logical data sequences. This technique eliminates the need to seek to another track to access a replacement of an sector allocated in a remote spare area. If defects, known as grown defects, occur during application of a hard disc drive, such skip and slip scheme is applied during an application, in the field, in the embodiment. It is applicable within a wide and unlimited range, as a spare area may be provided, e. g. on the user area or as a spare area array in essentially each of a plurality of at least one format feature, e. g. a track. Defects that occur during application are, if found, allocated to a spare sector, remote or non-remote. Afterwards they may be re-allocated in a contiguous free region on the user area.

Figure 3B:
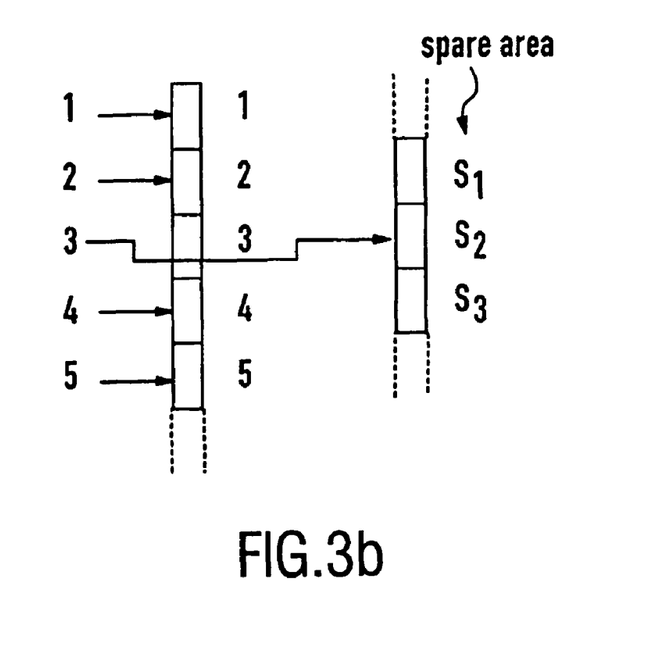
FIG. 3*b:* an allocation and mapping scheme for a defective sector due to a grown defect into a spare area according to a preferred embodiment.

In the situation depicted in FIG. 3*b*, in a preferred embodiment the physical sector PBA 3 is allocated to the replacement sector S2 in a remote spare area 16 as e. g. depicted in FIGS. 1 and 2*a*. The logical address LBA 3 is mapped to the replacement sector S2. Converting the physical sector PBA 3 into a slipped sector, is indicated in FIG. 3*a*. This allows for not only a shift in the logical to physical address mapping but also for a shift of a content of the corresponding sectors. In the example of FIG. 3*a* this means that the logical block address LBA 3 will be mapped on the physical block address PBA 4, LBA 4 will be mapped on PBA 5, LBA 5 will be mapped on PBA 6 and so on. At the same time the content of PBA 3 which is located at the replacement sector S2 has to be re-allocated from S2 to PBA 4 and the content of PBA 4 can be moved to PBA 5 and so on. This slipping in the field should continue until a free sector e. g. a spare sector is reached. Otherwise, a discontinuity in the logical to physical mapping exists as it is the case e. g. when a sector is allocated to a replacement sector.

The sole allocation process of a defective sector without re-allocation as conventionally practised causes an extra delay in service time of a disc drive. When the drive 1 encounters a defective sector and decides to allocate it to a remote spare sector 16, the head 3 is moved from the track with the defective sector in the user area to a track where spare sectors are allocated in a remote spare area 16. When the right spare sector is rotated under the read/write-head 3, the data is written to the spare sector. Subsequent, if the drive has to resume reading or writing, the head is moved back to the original track 8 where the defective sector was found. This process costs extra time due to searching and accessing the sector allocated in the remote spare area 16: the head 3 has to move to the spare sector in a remote spare area 16 to read or write at the spare sector and the head 3 has to move back to resume reading or writing. In a real-time audio-video application therefore, conventional methods for handling data and a conventional data storage apparatus may not guarantee a maximum service time in case an error occurs. Alternatively delivering erroneous or incomplete data to the host and reporting the error has to be taken into account. When accessing a data pool with one or more erroneous sectors, the drive will also be unable to finish the request within the maximum service time.

Figure 4:
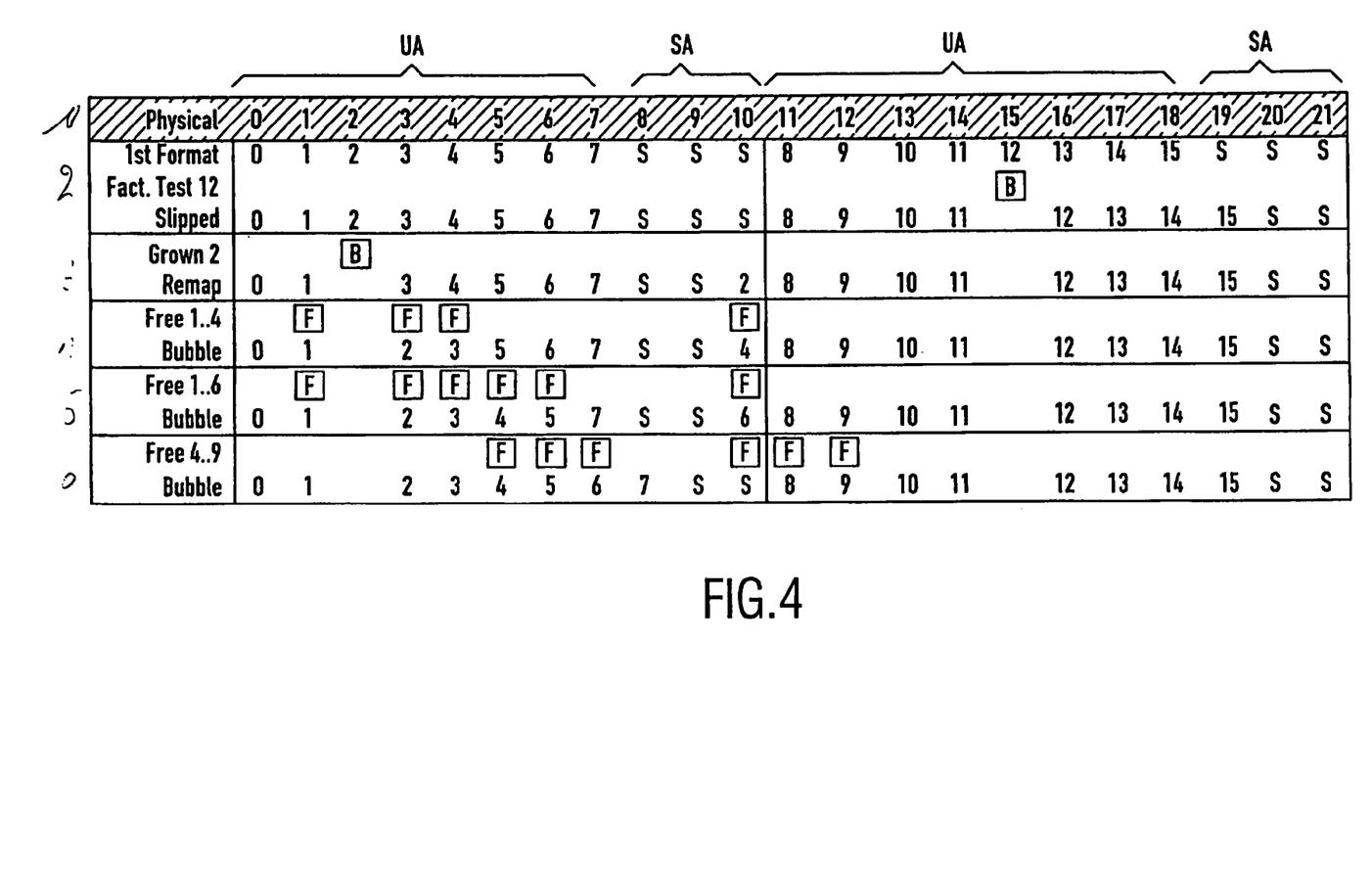
FIG. 4: an example of repeated partial re-allocation and re-mapping of grown defect data originally mapped in a spare area into a contiguous free region in the user area according to a preferred embodiment of the invention.

FIG. 4 illustrates an example according to a preferred embodiment how to convert sectors allocated in a spare area SA of spare sectors S into slipped or skipped sectors in the user area UA and to thereby prevent a delay in request service times. The skip and slip scheme is applied for re-allocation during use of the disc drive for grown defects B. The sectors are re-allocated into a contiguous free region of sectors F. The spare area SA may be a remote spare area 16 of FIGS. 1 and 2a or a spare area SA assigned to essentially each track as depicted in FIG. 6 or a spare area S assigned to an allocation unit, in particular essentially each allocation unit, as depicted in FIG. 7. This scheme relies on the idea that slipped sectors compared to sectors, which are allocated in remote spare areas 16, cause much less or nearly negligible performance loss. According to the proposed concept it is possible to guarantee request service times in particular for audio-video applications. This is true even if access is made to a data pool that contained sectors allocated in a remote spare area as these sectors are re-allocated into contiguous free regions of sectors F in the user area UA.

In detail the proposed concept works according to a preferred embodiment as follows.

As outlined above a discontinuity in the logical to physical mapping may exist. This is the case when a sector is allocated in a remote spare area 16. Such discontinuity in the mapping is referred to as a "bubble". Therefore, in case of an allocation of a defect sector to a remote spare area 16 a bubble has only moved towards a spare area and still continues to exist. The bubble disappears only if it reaches a free area with a sufficient number of free sectors. Such free area is provided in the preferred embodiment according to the proposed concept.

In the example of FIG. 4 only a fabrication defect may be provided only once by the slipping of sectors during manufacturing due to a defect sector at the physical block address PBA 15. This is referred to by B as the bad sector in the first row of FIG. 4 at logical block address LBA 15.

Further a grown defect may occur as indicated by B for a further grown defect at PBA 2 in the second row of FIG. 4. The corresponding data of the grown defect labelled with logical block address LBA 2 may be allocated and mapped into a spare area as indicated by "2" in the second row of PBA 10 of FIG. 4. In a further step information is provided about the size of a contiguous free region in the user area as indicated by F at PBA 1, PBA 3 and PBA 4 in the third row of FIG. 4. Such information is advantageously provided by the host to the drive and preferably declares the largest consecutive free area and not just the newly freed up area. This means that the hard disc drive does not have to keep track of a free list for the entire disc. As shown in the third row of FIG. 4 the drive uses this information to re-allocate logical sectors: the re-mapped sector LBA 2 is slipped and at the end of the free area a new type of bubble sector appears where the slipping stops and is still re-mapped. As soon as the application declares a new free area that overlaps the bubble, the bubble will be moved to the end of that area as indicated in row 4 of FIG. 4. This is repeated until finally the application declares a free area that allows the bubble to move into a contiguous free region with sufficient size in the user area as indicated in row 5 of FIG. 4. At that time the grown defect B has changed into regular slipped sectors that cause much less performance loss than a re-mapped or replaced sector.

Advantageously the bubble tends to cause much less performance loss than a re-mapped sector, because in practice the re-mapping of the bubble will happen at the end of an allocation unit. For a bubble the hard disc drive can always move to the re-mapped location of the bubble at the end of a regular data transfer.

The concept as outlined in FIG. 4 works best when disc space is used dynamically; the bubble may only move to a free region when there are sufficient many "free"-declarations, in particular sufficient many overlapping "free"-declarations. In particular the concept proposed works well in applications like those for personal video recorders, e.g. applications like those of the TiVo company. Applications of the mentioned kind usually comprise a service containing e.g. an electronic program guide to keep track of a preferred program profile. For such purpose a data storage apparatus, like a hard disc drive or a DVD, or a method of handling data on a data storage medium of the proposed kind is particular favourable. This is because for applications of the mentioned kind most of the disc content is refreshed in the course of a few days.

It is to be noticed that a bubble takes the same extra data storage capacity as a slipped or re-mapped sector. On the other hand it needs one extra item of administration for the current location of the bubble i. e. the end of the "free"-declaration.

Advantageously it is possible for the hard disc drive to also define downward bubbles that move downwards towards a re-mapped defect or an upward bubble as described above. When the downward bubble meets a re-mapped defect or on upward bubble, they annihilate into a single slipped sector. This would improve the statistics of actually reaching the slipped state. On the other hand the downward bubble takes up an extra spare sector during its life, and requires some extra administration.

Even in a scheme where special audio video commands will never access the re-mapped sectors, the bubble scheme is advantageous: a conventionally re-mapped sector corresponds to an error that is always on the same place. Converting it into a bubble makes the error advantageously move towards the end of a free area. Thereby new errors could be bubbled e. g. into a single lost cluster. As the bubbles move further upward, they will evaporate in the hard disc drive's free area. Extra measures, like protocol etc., are provided on the host's side to make this a guaranteed scheme. Even in a simple approach the proposed concept help in gradually sweeping the system clean.

A simple error-report mechanism that informs the host about the resulting logical bad sectors after the free command is advantageously applied. If a hard disc drive's spare area should be happened to be fully loaded the disc can in such a case only declare sectors to be bad. This is where the bubble-slip scheme is still advantageous. It provides a mechanism to sweep multiple bad sectors to a single logical address area which can then be avoided by the host. Again an error report mechanism after the free command is preferred.

Advantageously the above scheme makes the drive responsible for the work. It has the full knowledge about defect management. The only thing it may need is the free information from the host and the new concept of the bubble to make it work.

The host's file system could do a very similar same thing, and actually reserve or create more spare area if needed. The minimum requirement may be that the host can find out about the hard disc drives re-mapped sectors, best in a standardised way. The simplest approach would be then to never reuse a cluster with a re-mapped sector in it. Conventionally this may be rather costly of audio video systems with a typical cluster size of hundreds, thousands or even ten-thousands of sectors. To avoid such gross space loss, several schemes can be implemented, including bubble-like approaches as outlined above. The proposed method always provides an efficient mechanism to skip bad or re-mapped sectors in large requests.

Cutting a large request into smaller ones is possible but may have performance penalties similar to those related to current 128 Kbyte request size limitation. The alternative is to add a mechanism to inform the disc that known bad sectors should be excluded in the future. Preferably this is initiated on a sector by sector basis by the host, because also for the host the slip schemes are only easy in a free area. The advantage of this approach is that the host can easily create more spare areas. The need for slightly more protocol between a host and a hard disc drive is only a small disadvantage.

Figure 5:
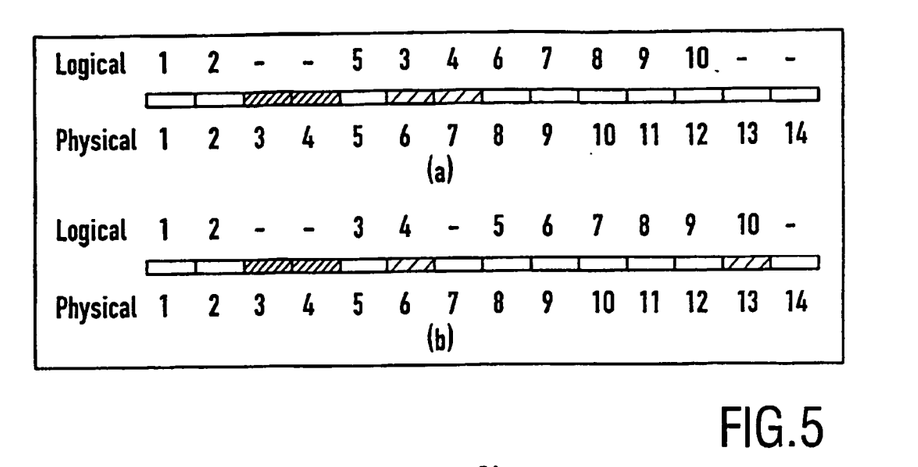
FIG. 5: an example of a further preferred embodiment with regard to non-remote spare area arrays provided essentially on each track of a data storage disc.

In FIG. 5 a bubble defect management combined with a track-based sparing is illustrated as a further preferred embodiment. In combination with above described scheme a spare area array SA of a number of spare sectors may be provided on essentially each track 8 as further shown in FIG. 6a and FIG. 6b. Thereby, advantageously full spare areas may be partly or completely be freed. As exemplified in the first row of FIG. 5 the physical sectors with PBA 3 and PBA 4 are re-allocated to the spare sectors of PBA 6 and PBA 7 respectively. Thereafter the sectors are slipped and the spare sector of PBA 7 is freed. According to the proposed embodiment a sector of PBA 13 in a spare area array is used instead.

Reserving spare sectors on each track means sacrificing drive capacity and performance. Because there will be less sectors per track, the data read or written on each disc rotation will also be less. So it is desirable to have as few spare sectors as possible on each track. On the other hand it is undesirable to have all the spare sectors on a track occupied. In this case a further grown defect would have been to be re-allocated to a spare sector on another track which would cause a performance loss and the request service time would again not be guaranteed. Again in such a case the conversion of re-allocated sectors into slipped sectors according to the proposed concept may be done as described above. To remove the small disadvantage of an extra protocol between the host and the drive and extra administration for the bubbles created as outlined above the conversion could also be done automatically. The extra free information from the host would become unnecessary as will be outlined for a further preferred embodiment.

In audio-video applications, a block of several megabytes is transferred at each disc access. Such a block includes a number of tracks. For example a block of 4 MB includes more than 10 tracks on a current hard disc drive with 800 sectors per track on the outer diameter. Since there are spare sectors on each track or allocation unit the drive can slip any sectors allocated to remote spare area by re-allocation within the reach of each write access. This way the slipping of the re-allocated sectors can be done automatically without the intervention of the host. Furthermore, this can be done on-the-fly, since the logical to physical address mapping is essentially done in the hard disc drive controller. Even if there are no spare sectors in the reach of each write access, the conversion can still be done automatically. The consequence is then that bubbles are introduced in the system.

Figure 6A:
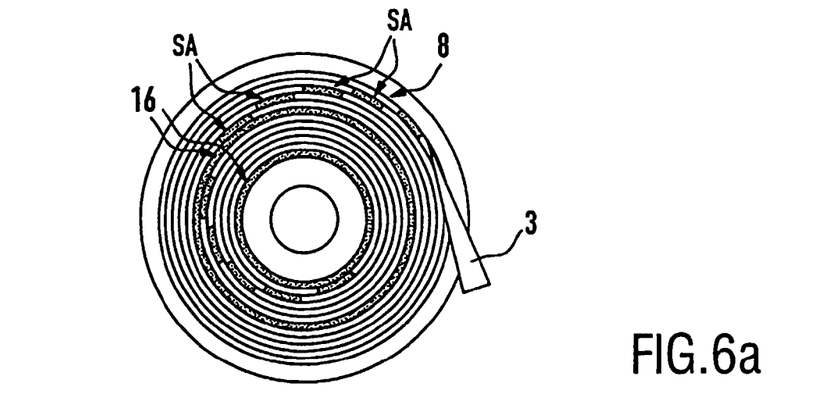
FIG. 6*a:* a non-remote spare sector being part of non-remote spare area arrays on a hard disc drive according to a preferred embodiment.
Figure 6B:
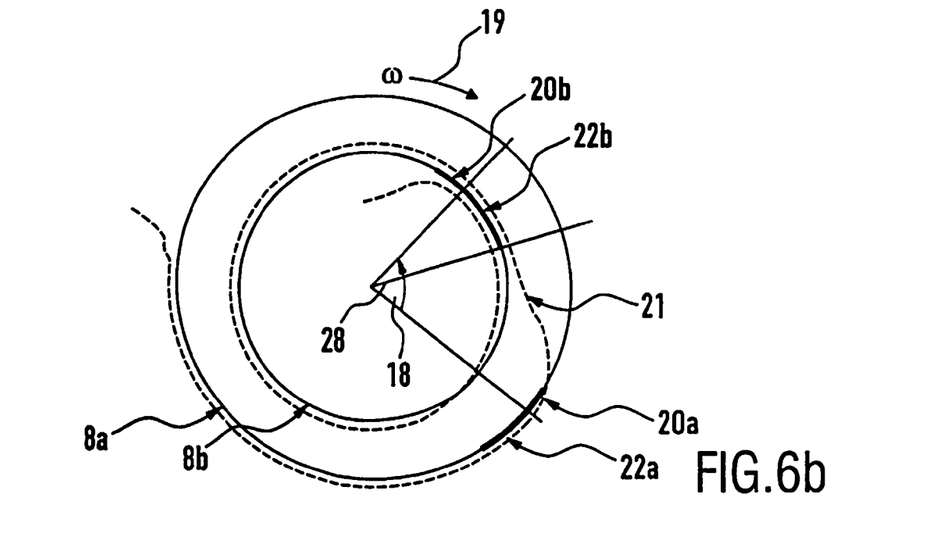
FIG. 6*b:* an extended skew on a hard disc drive taking into account spare area arrays on each track according to a preferred embodiment.

In general, conversion of re-allocated sectors into slipped sectors can be used to free spare area SA when there are a number of spare areas SA, S distributed over the disc, as for example shown in FIGS. 6a and 6b and anyone of them gets full.

A grown defect is advantageously re-allocated to the nearest available spare sector SA, S.

Advantageously spare sectors SA on each track 8a, 8b are allocated in advance of a start sector 20a, 20b or a servo wedge and a track skew 18 is extended respectively as depicted by reference mark 28 in FIG. 6b. The curved dashed line 21 in FIG. 6b shows the motion 21 of the read/write-head of the disc drive during a track switch. This shows that upon a track switch 21 from track n the head 3 is settled already on the new track n+1 to read or write the spare sectors 22b and the start sectors 20b due to the extended track skew 28. The spare sectors 22a of track n are in advance of start sectors 20a or a servo wedge.

A grown defect is preferably re-allocated to the nearest available spare sector SA. When a grown defect must be re-allocated further away, because the nearest spare area is occupied, the corresponding performance loss is slightly larger.

Even still then a mechanism as outlined above is advantageously applied especially in a real-time application to free spare space when a spare area SA gets full.

As conventional hard disc drives incorporate the logical block addresses into an error correction code at least a part of a disc must be overwritten if any changes are made in the logical to physical address mapping of the drive must be updated accordingly because the error correction code (ECC) of each sector. Therefore, advantageously to apply the above scheme physical addresses, in particular physical block addresses are used in the error correction code (ECC) instead of logical block addresses.

While there has been shown and described what is considered to be preferred embodiments of the invention it will of course be understood that various modifications and changes in form or detail could readily be made without departing from the spirit of the invention. It is therefore intended that the invention may not be limited to the exact form or detail herein shown and described nor to anything less than the whole of the invention herein disclosed and as herein after claimed.

The invention claimed is:

1. Data storage apparatus, comprising
    means for writing information on a data storage medium having a user area and a spare area defined thereon,
    means for allocating into the spare area, data assigned to portion user area having a medium defect, upon detection of the defect on the medium,
    means for providing information about the size of a contiguous free region in the user area, and
    means for at least partially re-allocating the data allocated in the spare area into the contiguous free region in the user area if the size of the contiguous free region exceeds or is equal to a determined threshold size.

2. The apparatus of claim 1, comprising an interface for receiving the information from a host connected to the interface.

3. The apparatus of claim 1, wherein the threshold size is determined in correlation with at least one logical consecutive sequence of the data mapped in the spare area.

4. The apparatus of claim 1, wherein the threshold size is essentially equal to the size of the largest contiguous free region in the user area.

5. The apparatus of claim 1, wherein the information is provided by a controller comprised by the apparatus.

6. The apparatus of claim 1, wherein a plurality of spare area arrays is provided and each of the arrays respectively is assigned to essentially each of a plurality of format features, in particular a track and in particular serves as a contiguous free region in the user area.

7. The apparatus of claim 1, wherein the data are re-allocated by slipping.

8. The apparatus of claim 1, wherein the re-allocation and re-mapping of data from the spare area to the user area in the further step is repeated until all data of at least one logical consecutive sequence is re-allocated in the contiguous free region in the user area.

9. The apparatus of claim 1, wherein the information is written using an error correction code being based on physical block addresses, in particular instead of logical block addresses.

10. The apparatus of claim 1, wherein defect data are mapped or re-mapped to a preferred predetermined address area.

11. The apparatus of claim 1, wherein a protocol between the storage apparatus and a host records information on the re-allocation of data, in particular on re-map-, -map- and slip-data.

12. The apparatus of claim 1, wherein the re-mapping is done on-the-fly, in particular by being essentially controlled solely by a storage apparatus controller.

13. The apparatus of claim 1, wherein the re-mapping is implemented in a de-fragmentation process, in particular by being at least partially controlled by a host during an occasional de-fragmentation process.

14. A method for handling data on a data storage apparatus comprising a data storage medium, in particular for handling data on a disc drive comprising a data storage disc, the medium having a user area and a spare area defined thereon, the method comprising the acts of:
  allocating into the spare area the data assigned to the defect area uppon detection of a defect on the medium,
  providing information about the size of a contiguous free region in the user area, and
  reallocating a portion of the data allocated in the spare area into the contiguous free region in the user area if the size of the contiguous free region exceeds or is equal to a determined threshold size.

15. The method of claim 14, comprising the act of providing the information by a host connected to the apparatus by an interface.

16. The method of claim 14, comprising the act of determining the threshold size in correlation with at least one logical consecutive sequence of the data mapped in the space area.

17. The method of claim 14, comprising the act of setting the threshold size to be essentially equal to the size of the largest contiguous free region in the user area.

18. The method of claim 14, comprising the act of providing the information by a controller comprised by the apparatus.

19. The method of claim 14, comprising the act of providing a plurality of spare area arrays and each of the arrays respectively is assigned to essentially each of a plurality of format features, in particular a track and in particular serves as a contiguous free region in the user area.

20. The method of claim 14, wherein the data are re-allocated by slipping.

21. The method of claim 14, comprising the act of repeating the re-allocation and re-mapping of data from the spare area to the user area until all data of at least one logical consecutive sequence is re-allocated in the contiguous free region in the user area.

22. The method of claim 14, using an error correction code being based on physical block addresses (PBA), in particular instead of logical block addresses (LBA).

23. The method of claim 14, comprising the act of mapping or re-mapping defect data to a preferred predetermined address area.

24. The method of claim 14, comprising the act of recording information on the re-allocation of data, in particular on re-map-, -map- and slip-data, according to a protocol between the storage apparatus and a host.

25. The method of claim 14, comprising the act of adapting the method to be solely controlled essentially by a storage apparatus controller.

26. The method of claim 14, comprising the act of adapting the method to be implemented in a de-fragmentation process by being at least partially controlled by a host.

* * * * *